No. 749,223. PATENTED JAN. 12, 1904.
J. F. RABE.
COOKING APPARATUS.
APPLICATION FILED MAY 9, 1903.
NO MODEL.

WITNESSES
INVENTOR
J. F. Rabe

No. 749,223. Patented January 12, 1904.

UNITED STATES PATENT OFFICE.

JOHANNES FRIEDRICH RABE, OF KIEL, GERMANY.

COOKING APPARATUS.

SPECIFICATION forming part of Letters Patent No. 749,223, dated January 12, 1904.

Application filed May 9, 1903. Serial No. 156,412. (No model.)

*To all whom it may concern:*

Be it known that I, JOHANNES FRIEDRICH RABE, a subject of the King of Prussia, German Emperor, residing at Kiel, Germany, have invented certain new and useful Improvements in Cooking Apparatus, of which the following is a specification.

In order to easily and economically prepare foods which require careful observation while being cooked and have to stand a long time on the fire, the present invention has been devised, whereby the foods which are boiled for a short time only are introduced into an apparatus consisting of a vessel adapted to be closed, which vessel surrounds the pot containing the food on all sides with a heat insulating or retaining material.

The characteristic feature of the apparatus consists in the peculiar arrangement whereby it is possible to fit the heat-retaining casing on all sides of the pot, even where various-sized pots are employed, and as a consequence to efficiently retain the heat in the food due to the boiling.

In order to attain the object sought for, the vessel, which is lined on all sides with a material which is a bad conductor of heat—such as hay, for instance—is closed by a box-like frame or lid of a given height, having its inner part or bottom formed of flexibly-elastic material, which closely fits the cover of the cooking vessel. Where pots of various sizes are employed, they are held in position by the insertion of pads or cushions also of a material which is a bad conductor of heat, so whatever the size of the pot their covers rest against the flexible or close-fitting inside of the upper closing frame or lid.

Figure 1:
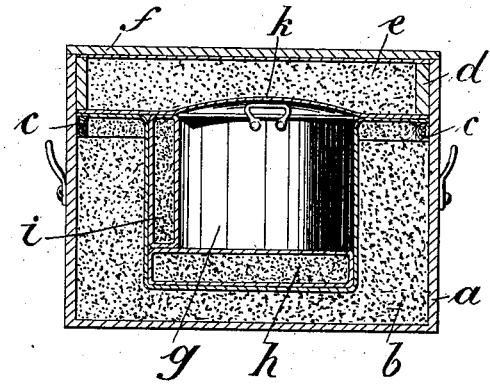
Figure 2:
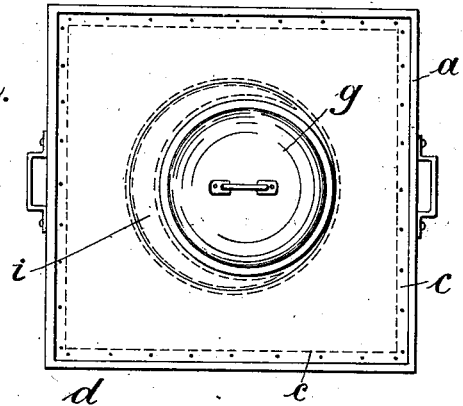
Figure 3:
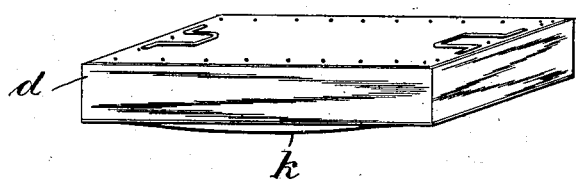

The object of the invention is shown in the accompanying drawings, Figure 1 being a vertical section of a closed apparatus containing a cooking-pot; Fig. 2, a plan view of the same with the cover removed, while Fig. 3 is a view in perspective of the upper frame or lid.

The apparatus consists of a container *a*, of wood or the like, lined internally on all sides with a material *b*, which is a bad conductor of heat, such as hay. At a given place and at a certain height from the bottom of the vessel there are internal bars *c*, on which rests upper closing frame or lid *d*, which is also filled with hay *e* or the like. After the foods—such, for instance, as rice, stone-fruits, meat soups, or the like, which require some hours cooking and which easily burn—have been boiled for from ten to fifteen minutes on a fire in the cooking vessel *g* the said vessel, together with the lid fitted thereon, is inserted in the apparatus, and if the pot be a small one a somewhat-thick cushion *h* is previously inserted in the container *a*, while if the pot is a larger one this cushion may be omitted. A second cushion *i*, containing material which is a bad conductor of heat, is provided, so that where a small pot is used it may be everywhere protected at the sides and tightly inclosed by a material which is a bad conductor of heat. After the cooking-pot *g* has been inserted in the apparatus in this manner the closing or covering frame or lid *d*, which is tightly inclosed by the walls of the box, is inserted and its flexible or elastic bottom *k* fits tightly on the lid of the cooking-pot *g*. A cover *f* of the container *a* is then preferably shut down after the frame *d* has been inserted and the apparatus closed in order that no unauthorized person may find access to the food. After a few hours the previously only partly-cooked foods are quite ready and any burning of the same is avoided. The food is still warm after several hours and ready for serving.

By the use of insertion pads or cushions *h* and *i* of different sizes, one of which cushions is shown in Fig. 2 in a sickle-shaped form, varied sizes of pots may be employed with the same apparatus, as the pots are always securely inclosed on all sides by the insulating or non-conducting material.

In order to make the apparatus as compact as possible, compressed material—for instance, compressed hay—may be employed for the padding or lining.

What I claim, and desire to secure by Letters Patent of the United States, is—

1. A heat-retaining apparatus comprising a container having a permanent lining formed of a bad conductor of heat, a cover or lid having a similar permanent lining and a crescentshaped non-conducting pad arranged to fit around the vessel within the container; substantially as described.

2. A heat-retaining apparatus comprising a container having a permanent lining formed of non-conducting material, and removable side and bottom pads arranged to fit within the container in contact with the vessel therein; substantially as described.

3. In a heat-retaining apparatus, a container lined on its side and bottom with a poor conductor of heat and having a cylindrical recess to fit a vessel, a removable circular pad for the bottom of the recess and another removable pad arranged to surround the vessel within the recess, both of said pads being poor conductors of heat; substantially as described.

In testimony whereof I have hereunto set my hand in the presence of two witnesses.

JOHANNES FRIEDRICH RABE.

Witnesses:
  JULIUS RÖPKE,
  WILHELM HEBERER.